United States Patent Office 3,098,706
Patented July 23, 1963

3,098,706
PREPARATION OF BIMETALLIC HYDRIDES
Sidney M. Blitzer, Albert P. Giraitis, and Joseph R. Zietz, Jr., Baton Rouge, La., assignors to Ethyl Corporation, New York, N.Y., a corporation of Virginia
No Drawing. Filed Dec. 12, 1961, Ser. No. 158,893
5 Claims. (Cl. 23—14)

This invention relates to the preparation of bimetallic hydrides.

Bimetallic hydrides have been prepared by various methods propounded in the art, for example, the compound sodium aluminum hydride is prepared by the reaction between sodium hydride and aluminum bromide as disclosed in U.S. 2,576,311 utilizing room temperatures and ethers and ether solvents. The product produced, although of satisfactory purity, is obtained in relatively low yields and, furthermore, with all the attendant difficulties that are encountered when ether is employed as a solvent. In a similar procedure the compound calcium aluminum hydride is prepared, however, the compound obtained is an etherate of only moderate purity. Additionally, aluminum hydride has been reacted with sodium hydride to produce sodium aluminum hydride. Another reaction is that between lithium hydride, boron triethyl and hydrogen to obtain lithium borohydride. Thus, these and other procedures are disclosed for the preparation of bimetallic hydrides. Also modification of the above procedures involving the use of a multitude of solvents, temperature modifications, various halides, and the like have been explored with little promise of large scale commercial adaptability. Furthermore, even the fairly successful reaction of aluminum hydride with sodium hydride as taught by A. E. Finholt, A. C. Bond, Jr., and H. I. Schlesinger, J. Amer. Chem. Soc. 69, 1199 (1947) which involves a cyclic procedure as further illustrated by the following equation:

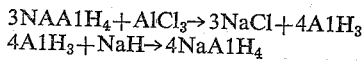
$$4AlH_3 + NaH \rightarrow 4NaAlH_4$$

has certain limitations as, for example, an increasing unreactivity and subsequent formation of gummy deposits resulting in filtration difficulties with each addition of aluminum chloride. Furthermore, large commercially undesirable reactor volumes are required due to the necessity of recycling three-fourths of the product obtained.

It is an object of this invention to produce bimetallic hydrides in a simple, direct, economical manner and, furthermore, in a manner which overcomes those attendant difficulties as described hereinbefore and others taught in the art.

These and other objects are realized by the thermal decomposition, preferably under the influence of a catalyst, of a bimetallic alkyl hydride of aluminum or boron, wherein the second metal is selected from the group consisting of an alkali metal and an alkaline earth metal. Thus, the feed material for the process is represented by the formula

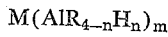

wherein M is a metal selected from the group consisting of alkali metals and alkaline earth metals, R is a hydrocarbon radical selected from the group consisting of alkyl and cycloalkyl radicals, and having up to 20 carbon atoms, $n$ is an integer of not more than 3, and $m$ is the valence of M.

The radical R is an alkyl or cycloalkyl hydrocarbon as defined hereinbefore. When R is a straight chain or normal alkyl, typical examples are methyl, ethyl, propyl, butyl, pentyl, hexyl, decyl, tridecyl, pentadecyl, nonyldecyl, eicosyl. However, it is generally preferred that R be branched chain alkyl groups such as isopropyl, isobutyl, tertiary butyl, 1-methyl pentyl, 3-tertiary butylhexyl, 5-isopropyl-7-isobutyl tridecyl and the like. Furthermore, R can be cycloalkyl groups such as cyclobutyl, cyclopentyl, cyclohexyl, cycloheptyl; or substituted cycloalkyls such as 1-methyl cyclobutyl, 1-isopropyl cyclohexyl, 3-tertiary butyl cycloheptyl, and the like.

The decompositions effected by the process of this invention are catalytic. Thus, the process of this invention is promoted by heat or by standard reduction catalysts such as platinum, palladium, platinum black, chloro platinic acid, platinum oxide, palladium black, palladium oxide, nickel, nickel oxide, Raney nickel, cobalt, copper oxide, zinc oxide, chromium oxide, molybdenum oxide, copper chromite, zinc chromite, and molybdenum sulfide and the like. Furthermore, metallic elements such as platinum, palladium, nickel and the like may be utilized as catalysts on an inert support such as asbestos, silica gel, zeolite, baruim sulfate, activated charcoal, and the like.

Diluents are not critical to the process of this invention and the process is preferably conducted in the absence of diluents. However, in those cases where a diluent is desired, as for example, to further increase the efficiency of the reaction by causing greater contact between the reactant and the catalyst employed, an inert diluent is employed, preferably inert paraffin hydrocarbons such as, hexane, octane, decane, dodecane, tetradecane, hexadecane and mixtures thereof, cyclohexane, methyl hexane, heavy naphthas, kerosene, and the like.

Ordinarily the process of this invention is conducted at or below atmospheric pressure. For economic reasons, atmospheric pressures are preferably employed, however, in those instances where one of the reaction products is a high boiling olefin, it is desirable to conduct the reaction under reduced pressure.

The bimetallic alkyl hydrides utilized in the process of this invention are prepared by various methods, as for example, that method disclosed in Belgian Patent No. 512,267 wherein a trialkyl aluminum compound is reacted with alkali metal hydride to produce the bimetallic trialkyl hydride. Other methods of preparation are more fully exemplified in the examples which follow. All parts and percentages in the following examples are by weight.

Example I

Into a reaction vessel containing 142 parts of diisobutyl aluminum hydride is added with agitation 24 parts of sodium hydride. During the addition, heat is evolved and a molten product, sodium aluminum dibutyl dihydride (M.P. 71–73° C.) is formed. Five parts of nickel acetyl acetonate is then added, forming a finely divided nickel powder by reaction with a small quantity of the sodium aluminum alkyl hydride. Pressure on the system is then reduced from atmospheric to 1 mm. and decomposition is carried out at a temperature of 140 to 145° C. Isobutylene by-products are collected in a cold trap in the system leaving in the reaction flask the residual sodium aluminum hydride product. A portion of the sodium aluminum hydride product was hydrolyzed. The resulting gas contained 98 mole percent hydrogen and 2 mole percent isobutane. Further purification of the product is effected by solution in ethylene glycol and methyl ether, filtration and evaporation of the solvent.

Example II

Into a reaction vessel containing 86 parts of diethyl aluminum hydride is added, while agitating, 8 parts of lithium hydride. During the addition there is an evolution of heat with the formation of lithium aluminum diethyl dihydride. Four parts of platinum oxide is thereafter added as a catalyst. Atmospheric pressure is maintained on the system and the decomposition is carried out at about 80° C. Ethylene by-products are vented from the reactor, and are separately collected, if desired, and a good yield of lithium aluminum hydride product is achieved in the reactor.

*Example III*

The foregoing operations of Example II are repeated, except that the original charge is an equimolal mixture of lithium aluminum diethyl dihydride and lithium aluminum ethyl trihydride, being usually referred to as lithium aluminum ethyl sesquihydride. Six parts of platinum oxide are used as catalyst, and a good yield of lithium aluminum hydride is achieved.

*Example IV*

Sodium aluminum tris (2-phenyl-1-propyl) hydride is added to a reaction vessel and heated at atmospheric pressure to a temperature of 150° C. Upon completion of the decomposition, the by-product α-methyl styrene is removed from the reaction mixture by reducing the pressure on the system by 100 mm. and subsequent distillation to obtain the product sodium aluminum hydride in good yields.

*Example V*

Into a reaction flask provided with means for heating is added potassium boron tricyclohexyl hydride. The temperature is raised to 295° C. and maintained throughout the course of the decomposition. Cyclohexene by-products are removed from the system by distillation to obtain the product potassium borohydride.

*Example VI*

Bis(triisobutyl aluminum hydride) calcium, $$Ca(Al(i-C_4H_9)_3H)_2$$

is added to a reaction flask and subsequently heated at atmospheric pressure to a temperature of 100° C. in the presence of 5 parts of Raney nickel. The isobutylene by-products are collected in a cold trap in the system leaving in the reaction flask residual calcium aluminum hydride product.

The bimetallic hydrides produced by the process of this invention find utility as strong reducing agents and can be effectively used in reducing wide varieties of organic compounds, for example, the reduction of carbon dioxide to derivatives of formaldehyde, of esters to alcohols or aldehydes, or nitro compounds to azo compounds, of nitriles to amines and the like. One particular advantageous property of these compounds when employed as reducing agents is their specificity of reaction, as they in most instances reduce functional groups such as the nitro amino carbitol and other reducible groups of compounds containing an unsaturated carbon to carbon linkage without attacking said carbon to carbon link. Furthermore, these compounds produced by the process of this invention find utilization as intermediates for the preparation of high energy fuels.

This application is co-pending with our application Serial No. 651,799, filed April 10, 1957, now abandoned.

Thus, having described this invention, it is not intended that the process set forth herein be limited except by the scope of the accompanying claims.

We claim:
1. A process for the preparation of bimetallic hydride comprising the thermal decomposition of a bimetallic alkyl aluminum hydride of the formula

$$M(AlR_{4-n}H_n)_m$$

wherein
  M is a metal selected from the group consisting of alkali metals and alkaline earth metals,
  R is a hydrocarbon radical selected from the group consisting of alkyl and cycloalkyl radicals, and having up to 20 carbon atoms,
  n is an integer of not more than 3, and
  m is the valence of M, said process being conducted at a pressure not in excess of about atmospheric pressure and in the presence of a catalyst, said catalyst being a standard reduction catalyst selected from the group consisting of platinum, palladium, platinum black, chloro platinic acid, platinum oxide, palladium black, palladium oxide, nickel, nickel oxide, Raney nickel, cobalt, copper oxide, zinc oxide, chromium oxide, molybdenum oxide, copper chromite, zinc chromite, and molybdenum sulfide.

2. A process for the preparation of sodium aluminum hydride comprising the catalytic thermal decomposition of sodium aluminum alkyl hydride, containing only one sodium atom and one aluminum atom, in the presence of a nickel catalyst; said process being conducted at a pressure ranging from atmospheric to sub-atmospheric pressures.

3. A process for the preparation of sodium aluminum hydride which comprises the catalytic thermal decomposition of sodium aluminum diisobutyl dihydride in the presence of nickel acetyl acetonate at a pressure ranging from atmospheric to subatmospheric pressures.

4. A process for the preparation of lithium aluminum hydride which comprises the catalytic thermal decomposition of lithium ethylaluminum sesquihydride in the presence of platinum oxide at atmospheric pressure.

5. A process for the preparation of calcium aluminum hydride which comprises the catalytic thermal decomposition of bis(triisobutylaluminum hydride) calcium in the presence of Raney nickel at atmospheric pressure.

References Cited in the file of this patent

Office of Naval Research, London, "European Scientific Notes," volume 6, No. 13, pages 178, 179 and cover sheet (July 1, 1952).